June 5, 1962     R. L. WOODS     3,037,276

METHOD OF MAKING A KEYED HUB

Filed Jan. 15, 1959     2 Sheets-Sheet 1

Robert L. Woods
INVENTOR.

BY Clarence A. O'Brien
and Harvey B. Jacobson
Attorneys

June 5, 1962 R. L. WOODS 3,037,276
METHOD OF MAKING A KEYED HUB
Filed Jan. 15, 1959 2 Sheets-Sheet 2

Robert L. Woods
INVENTOR.

BY Clarence A. O'Brien
and Harvey B. Jacobson
Attorneys

United States Patent Office 3,037,276
Patented June 5, 1962

---

3,037,276
METHOD OF MAKING A KEYED HUB
Robert L. Woods, Houston, Tex., assignor to Ventco, Inc., a corporation of Texas
Filed Jan. 15, 1959, Ser. No. 787,040
4 Claims. (Cl. 29—512)

This invention relates in general to new and useful improvements in the construction of hubs and more specifically to an improved method of making a keyed hub.

In the manufacturing of fan blades and other small rotating devices, a hub is secured to a mounting plate by means of a flared neck utilizing a punch press, dies or other flaring tools. To minimize slippage of the hub and plate, serrations or notches are cut in the periphery of the plate hole during the blanking operation. As the neck is flared over the plate, some of the material of the neck is forced into these notches. However, this conventional process does not entirely solve the slippage problem, particular in severe torque applications.

The obvious solution to the foregoing problem is to provide a key connection between the plate and the hub. However, while the keyway may be formed in the plate during the blanking operation, on the other hand, the problem of providing the key is a difficult one. If a separate key is used, the problem is two-fold in that a special machining operation is necessary to form the keyway in the hub and because of the fact that the plate is relatively thin, it is extremely difficult to properly position the key. On the other hand, under normal conditions to form the desired key integral with the hub would require extensive machining of the hub.

It is therefore the primary object of this invention to provide a method of making a keyed hub wherein the key of the hub is formed integral with the hub proper and such key is formed in a very simple machining operation.

Another object of this invention is to provide an improved method of forming a keyed hub, the method including the steps of forming a collar on the hub at the desired location of the key, and removing all of the collar with the exception of the key whereby the desired integral key remains.

Still another object of this invention is to provide an improved method of forming integral keys on hubs, the method including steps of forming a projecting collar on the hub, shearing from the hub a major portion of the collar to leave integral with the hub the key and to shear from the hub a generally C-shaped member, which member forms a spacer for the plate to be secured to the hub by means of the key.

A further object of this invention is to provide an extremely simple method of forming a hub with an integral key, the method including the steps of turning the desired hub with there being disposed in the desired position for the key a projecting collar, there being disposed immediately adjacent the collar a recess having a width equal to the width of the collar, and shearing from the hub a major portion of the collar so as to leave the desired key and to shear from the hub a C-shaped spacer, the spacer falling into the recess and forming a suitable backing for the plate which is secured to the hub against rotation through the use of a key.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7:
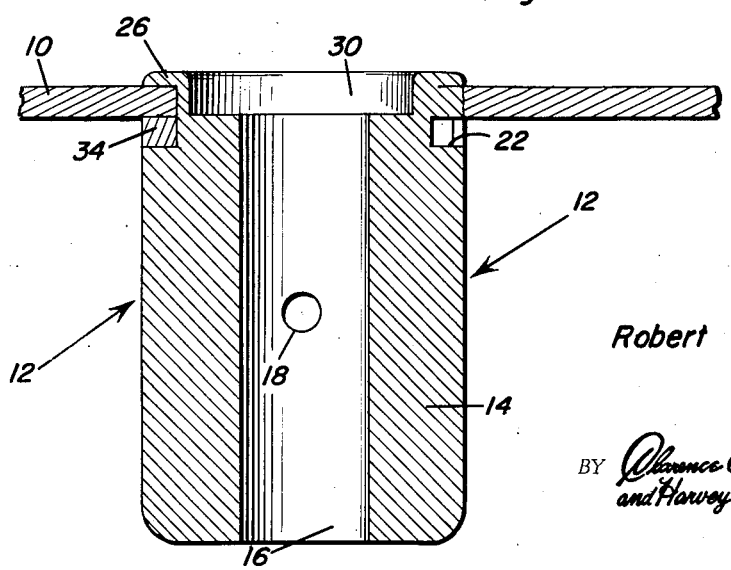
FIGURE 7 is a sectional view taken through the center of the finished product and shows the connection between the plate and the keyed hub.

In accordance with the present invention, it is desired to secure to a hub a plate in such a manner that the plate is prevented from slipping relative to the hub. The plate and hub connection is best illustrated in FIGURE 7 and includes a plate 10, which may be the center of a fan blade, or any other type of member which is to be driven, and the keyed hub which is the subject of this invention, the keyed hub being referred to in general by the reference numeral 12.

Figure 1:
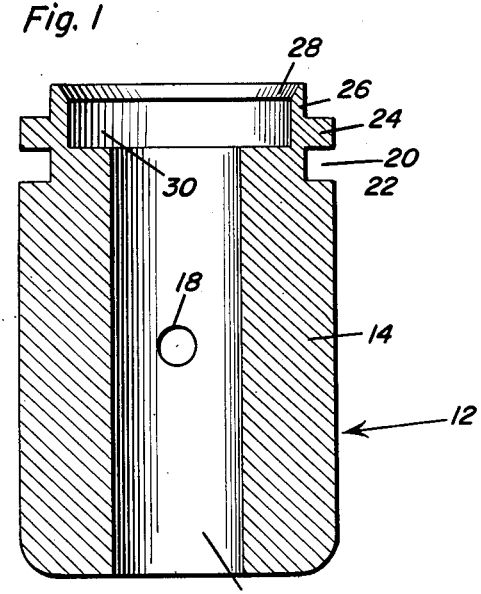
FIGURE 1 is an enlarged longitudinal sectional view taken through a member which has been turned or cast to the desired initial shape in the formation of the keyed hub.

Referring now to FIGURE 1 in particular, it will be seen that there is illustrated the keyed hub 12 in its initial stage of machining. The keyed hub 12 may either be cast in the shape illustrated in FIGURE 1 or may be machined in a lathe or screw machine, whichever is found to be most economically feasible. The keyed hub 12, as it appears in FIGURE 1, includes a hub body 14 having an elongated shaft receiving bore 16 therethrough. Extending transversely of the shaft receiving bore 16 is a bore 18 through the hub body 14, the bore 18 being adapted to receive either a pin or a setscrew so as to secure the hub 14 on a shaft (not shown).

Adjacent one end of the hub body 14 is formed a recess 20 which defines a shoulder 22. The recess 20 also serves to define one side of a projecting collar 24. Disposed immediately adjacent the collar 24 is a terminal sleeve 26, the terminal sleeve 26 being relatively thin and having an inner flared outer end 28. It is also pointed out that the bore 16 is enlarged as at 30 at the end of the hub body 14 extending outwardly from the collar 24 to the end of the hub body 14.

Figure 4:
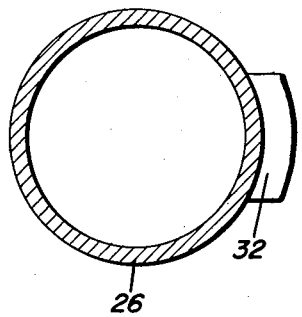
FIGURE 4 is a horizontal sectional view taken substantially upon the plane indicated by the section line 4—4 of FIGURE 3 and shows the general outline of the key, the lower portion of the hub being omitted for purposes of clarity.
Figure 2:
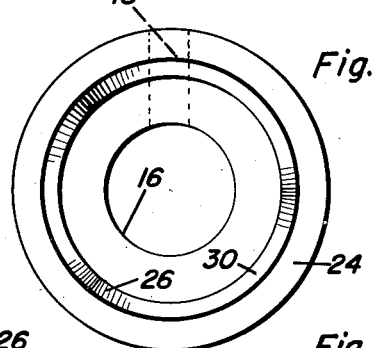
FIGURE 2 is a plan view of the member of FIGURE 1 and shows the general outline thereof.
Figure 5:
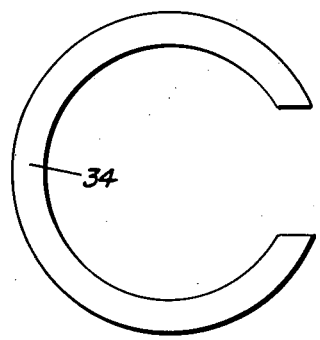
FIGURE 5 is a plan view of the C-shaped spacer which is sheared from the hub proper during the formation of the key.

After the keyed hub 12 has been formed, as is illustrated in FIGURES 1 and 2, a major portion of the collar 24 is sheared away so as to define a key 32, as is best shown in FIGURE 4. During the shearing operation there is formed a generally C-shaped spacer 34 which is best illustrated in FIGURE 5. As the C-shaped spacer 34 is sheared from the remainder of the hub body 14, it is moved downwardly into the recess 20 in abutting relation to the shoulder 22. The keyed hub 12 is then complete and ready to receive the plate 10.

As is best illustrated in FIGURE 1, the C-shaped spacer 34 is sheared from the hub body 14 by placing the hub body 14 in an inverted position of FIGURE 1 into a die 36, the die 36 being so configurated so as to shear the C-shaped spacer 34 from the hub body 14. Then a punch 38 engages the upper end of the hub body 14 and drives the hub body 14 downwardly to effect the shearing operation.

Figure 6:
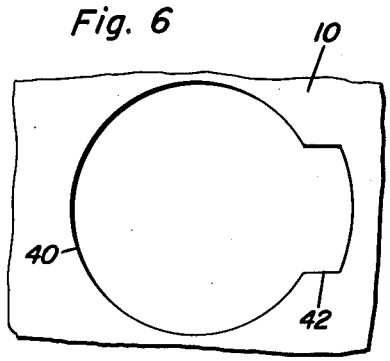
FIGURE 6 is a fragmentary plan view of the central part of the plate which is to be secured to the keyed hub and shows the outline of the opening formed therein for reception of the keyed hub.
Figure 8:
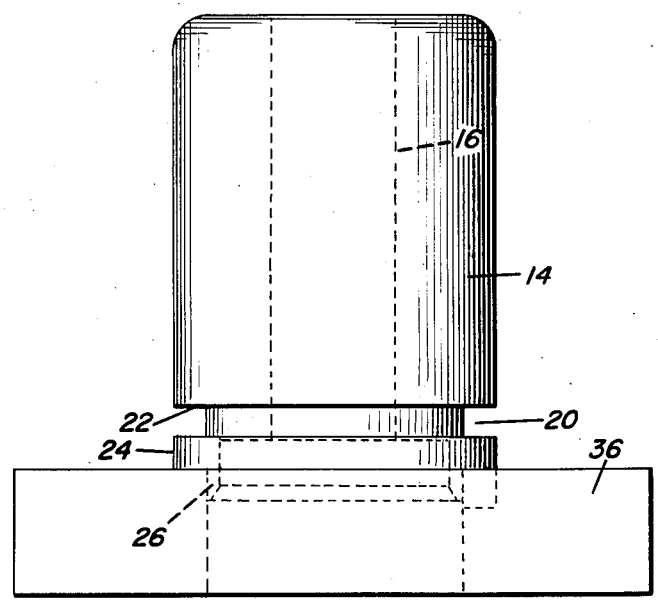
FIGURE 8 is a fragmentary elevational view showing the manner in which the C-shaped spacer is sheared from the hub proper to form the key on the hub.

Referring now to FIGURE 6 in particular, it will be seen that the plate 10 has an opening 40 therein, which opening is formed during the blanking operation on the plate 10. The opening 40 also includes a keyway 42.

Figure 3:
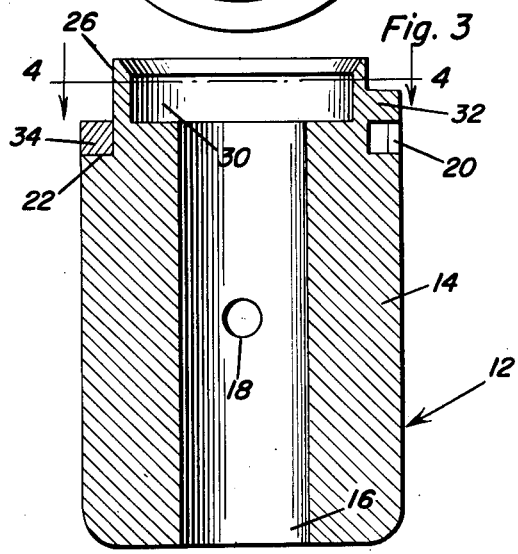
FIGURE 3 is a sectional view similar to FIGURE 1 and shows the member after the key has been formed thereon to function as the keyed hub.

After the keyed hub 12 has been formed, the plate 10 is telescoped over the upper end of the keyed hub, as illustrated in FIGURES 1, 3 and 7, with the keyway 42 being aligned with the key 32. After this has been accomplished, the sleeve 26 is outwardly flared by a suitable tool so as to overlie the plate 10 and clamp the plate 10 against the C-shaped spacer 34 which is in turn clamped against the shoulder 22. Thus, the plate 10 is securely connected to the keyed hub 12 against rotation.

From the foregoing, it will be seen that there has been devised an extremely simple method of forming a key or a hub integral therewith, which method may be accomplished at a minimum of cost and at the same time the keyed connection being of such a nature so as to produce the desired strength in the connection between the plate and the hub.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The method of making a keyed hub member comprising the steps of forming material into a rigid hub having a central axis, forming a peripheral groove around said hub and its axis spaced axially inwardly of one end of the hub so that the material remaining between the groove and one end comprises a radially outwardly projecting collar integral with and surrounding the one end, axially shearing a major C-shaped portion of said collar from said one end, forcing said C-shaped portion axially across said groove and into abutting relation with the axially innermost side wall of said groove, leaving a minor portion of said collar integrally secured on said one end to serve as a key.

2. The method of making a keyed hub member comprising the steps of forming material into a rigid hub having a central axis, forming a peripheral groove around said hub and its axis spaced axially inwardly of one end of the hub so that the material remaining between the groove and one end comprises a radially outwardly projecting collar integral with and surrounding the one end, removing material from the axially outer side of said collar so as to form a sleeve at said one end of the hub projecting axially outwardly beyond said collar, axially shearing a major C-shaped portion of said collar from said one end, forcing said C-shaped portion axially across said groove and into abutting relation with the axially innermost side wall of said groove, leaving a minor portion of said collar integrally secured on said one end to serve as a key.

3. The method of making a keyed hub and plate assembly comprising the step of forming material into a rigid hub having a central axis, forming a peripheral groove around said hub and its axis spaced axially inwardly of one end of the hub so that the material remaining between the groove and one end comprises a radially outwardly projecting collar integral with and surrounding the one end, axially shearing a major C-shaped portion of said collar from said one end, forcing said C-shaped portion axially across said groove and into abutting relation with the axially innermost side wall of said groove, leaving a minor portion of said collar integrally secured on said one end to serve as a key, forming a plate with an opening with a key slot therethrough of a size to receive the one end of the hub and the key, inserting said one end and key through said opening and keyway and moving said plate against the axially outer surface of the C-shaped member, securing said plate to said hub.

4. The method of making a keyed hub and plate assembly comprising the steps of forming material into a rigid hub having a central axis, forming a peripheral groove around said hub and its axis spaced axially inwardly of one end of the hub so that the material remaining between the groove and one end comprises a radially outwardly projecting collar integral with and surrounding the one end, removing material from the axially outer side of said collar so as to form a sleeve at said one end of the hub projecting axially outwardly beyond said collar, axially shearing a major C-shaped portion of said collar from said one end, forcing said C-shaped portion axially across said groove and into abutting relation with the axially innermost side wall of said groove, leaving a minor portion of said collar integrally secured on said one end to serve as a key, forming a plate with an opening with a key slot therethrough of a size to receive the one end of the hub and the key, inserting said one end and key through said opening and keyway and moving said plate against the axially outer surface of the C-shaped member, deforming said sleeve snugly against the axially outer side of said plate for securing it to said hub.

References Cited in the file of this patent

UNITED STATES PATENTS

| | | |
|---|---|---|
| 376,014 | Rex | Jan. 3, 1888 |
| 1,050,121 | Frommer et al. | Jan. 14, 1913 |
| 1,705,463 | Andren | Mar. 12, 1929 |
| 1,883,906 | Hasselquist | Oct. 25, 1932 |
| 2,446,692 | Collins | Aug. 10, 1948 |
| 2,520,259 | Pummill | Aug. 29, 1950 |
| 2,526,802 | Carlile | Oct. 24, 1950 |
| 2,550,070 | La Brecque | Apr. 24, 1951 |
| 2,670,021 | Torresen et al. | Feb. 23, 1954 |